Nov. 1, 1949.  A. POKRAS  2,486,675
SEAL FOR HOT WATER TANKS
Filed Nov. 20, 1946
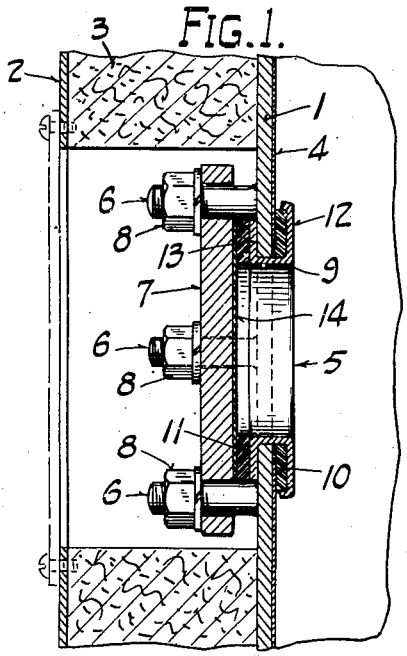
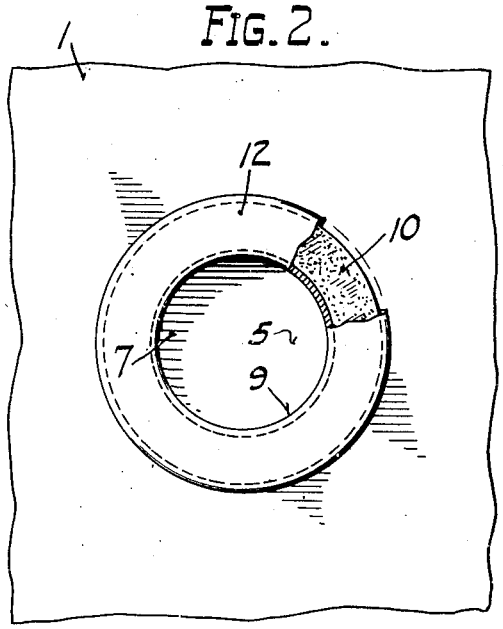
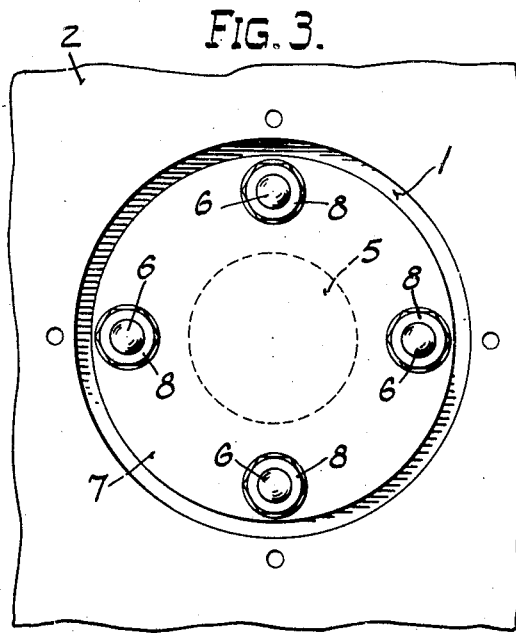
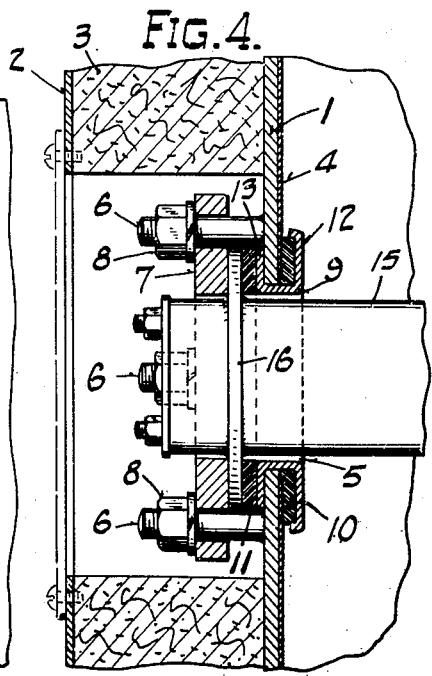
INVENTOR.
Adolph Pokras
BY
ATTORNEY.

Patented Nov. 1, 1949

2,486,675

UNITED STATES PATENT OFFICE 2,486,675

SEAL FOR HOT-WATER TANKS

Adolph Pokras, Milwaukee, Wis., assignor to A. O. Smith Corporation, Milwaukee, Wis., a corporation of New York Application November 20, 1946, Serial No. 711,051

10 Claims. (Cl. 219—38)

This invention relates to seals for openings in hot water tanks and particularly to seals for clean-out openings or for use where heating elements or thermostats are mounted in the wall of the storage tank.

One object of the invention is to provide a seal for an aperture in a ceramic enamel coated hot water tank which will protect the enamel coating and provide an efficient dependable seal which may be inexpensively manufactured and installed easily and quickly.

Another object is to provide a seal for mounting a heating element thermostat or the like in the wall of a hot water tank.

Another object of the invention is to provide a seal which is inexpensive in design and requires a minimum of corrosion-resistant metal for the parts thereof.

These and other objects and advantages of the invention are present in the preferred embodiment of the invention illustrated in the accompanying drawing:

In the drawing:

Figure 1 is a longitudinal sectional view of a part of a hot water heater and showing the seal of the invention;

Fig. 2 is an inside elevation of the installation;

Fig. 3 is an outside elevation of the installation; and

Fig. 4 is a longitudinal sectional view showing a heating element mounted in a tank with the seal of the invention.

The water heater, as shown in part in the drawing, comprises an inner tank 1, an outer casing 2 and the insulation 3 which is disposed therebetween to conserve the heat of the confined water. Tank 1 is lined with ceramic enamel 4 to protect the metal of the tank from corrosion in service.

The opening 5 in tank 1 which may be employed for clean-out purposes is surrounded by the circumferentially spaced studs 6 which are welded at their inner ends to the outer surface of tank 1 and project slightly outwardly from the tank.

Opening 5 is closed by closure plate 7 which has circumferentially spaced holes aligned with studs 6 for assembly thereof over the studs to close the opening. Plate 7 is shown as circular but may take any suitable shape. Nuts 8 are threaded onto the ends of the studs to secure plate 7 in place.

The joint between plate 7 and the tank wall is sealed by the stainless steel or corrosion-resistant alloy flanged sleeve or bushing 9, an inner washer 10 and an outer washer 11.

Sleeve 9 extends through opening 5 and when in place is provided with an inner flange 12 and an outer flange 13 both of which flanges extend generally parallel to the wall of tank 1.

Inner flange 12 engages inner washer 10 and confines the latter securely against the inside of tank 1 around opening 5. Outer flange 13 tightly engages the outer surface of tank 1 about opening 5.

The outer washer 11 is disposed between outer flange 13 and closure plate 7 to seal the joint therebetween.

The sleeve 9 being of stainless steel or corrosion-resistant alloy does not deteriorate by corrosion in service. Similarly the washers 10 and 11 are formed from a suitable plastic material such as Neoprene to withstand corrosion from the hot water in service.

Plate 7 may be lined on the inside with the ceramic enamel 14 or be provided with a corrosion-resistant alloy liner to prevent deterioration in service.

Under one method of assembly of the seal, washer 10 is placed on the inside of the tank wall around opening 5 and the sleeve 9 inserted in the opening from the inside so that inner flange 12 thereof which has previously been formed engages washer 10 and compresses the same tightly against the enamel lining 4 on the inside of tank 1 around opening 5 to seal the joint between washer 10 and tank 1 against the passage of fluid.

The outer end of sleeve 9 is then crimped against the outside of tank 1 around opening 5 to secure the sleeve in place and hold washer 10 tightly sealed against the inside of the tank around opening 5 by flange 12.

Outer washer 11 is then assembled against the outer surface of sleeve flange 13 and plate 7 is slipped over the studs 6 and brought into engagement with washer 11. Nuts 8 are then threaded over the outer end of studs 6 against plate 7. Upon tightening of the nuts plate 7 is forced toward flange 13 and compresses seal washer 11 tightly against the flange to seal the joint therebetween.

In the completed seal the heated water contacts the corrosion-resistant washers, sleeve 9 and the protected inside surface of closure plate 7. Sleeve 9 is generally thin and of dimensions enabling it to be provided of a corrosion-resistant alloy or the like at relatively low cost.

The seal prevents flow of the contents of the tank to the circumferential edge of the tank aperture and the inner tank wall for a substantial radial distance from the aperture, where the protective metal of the tank is likely to be exposed to corrosion.

The plastic seal 11 is mounted externally of the tank where it is easily replaced.

Fig. 4 illustrates the use of a seal for mounting an electric heating element 15. The seal is the same as described with respect to the previous embodiment and includes sleeve 9 with the inner and outer flanges 12 and 13, respectively, as well as the sealing washers 10 and 11.

Element 15 projects into the tank through sleeve 9. The element is provided with the flange 16 which is disposed between outer washer 11 and closure plate 7 and serves as a base to hold element 15 in place when the nuts 8 on studs 6 are tightened against plate 7. Flange 16 may be constructed similar to closure plate 7 in which event the closure plate could be eliminated, the flange 16 acting as a closure plate and being directly assembled over studs 6.

The seal also may be employed to mount thermostatic elements and the like in a hot water tank.

Various embodiments of the invention may be employed within the scope of the accompanying claims.

I claim:

1. In a seal for an opening in the wall of a lined metal tank wherein the edges of the tank wall at the opening are protected from exposure to the contents of the tank, a protective bushing constituting a sleeve-like body extending through the opening in the tank wall with an inner flange of substantial radial extent adjacent the inner surface of the lined tank wall and an outer crimped flange securing the bushing in place, a sealing washer confined between the inner flange of said bushing and the lined tank wall under pressure to prevent entrance of the fluid contents of the tank therebetween, and means sealed to said sleeve on the outside of the tank to close said opening and prevent escape of the contents of the tank.

2. In a seal for an opening in the wall of a lined metal tank wherein the edges of the tank wall at the opening are protected from exposure to the contents of the tank, a protective bushing constituting a sleeve-like body extending through the opening in the tank wall with an inner flange of substantial radial extent adjacent the inner surface of the lined tank wall and an outer crimped flange securing the bushing in place, a sealing washer confined between the inner flange of said bushing and the lined tank wall under pressure to prevent entrance of the fluid contents of the tank therebetween, studs welded to the tank wall about said opening, and a plate member assembled on said studs and sealed to said sleeve on the outside of the tank to close said opening and prevent escape of the contents of the tank.

3. In a seal for an opening in the wall of a lined metal tank wherein the edges of the tank wall at the opening are protected from exposure to the contents of the tank, a protective bushing constituting a sleeve-like body extending through the opening in the tank wall with an inner flange of substantial radial extent adjacent the inner surface of the lined tank wall and an outer crimped flange securing the bushing in place, a sealing washer confined between the inner flange of said bushing and the lined tank wall under pressure to prevent entrance of the fluid contents of the tank therebetween, an outer sealing washer disposed against the outer surface of the outer flange of said sleeve, and means for securing a plate member across the tank opening and to hold the same in sealing engagement with said outer washer.

4. In a seal for an element extending through the wall of a lined metal tank wherein the edges of the tank wall at the opening for the element are protected from exposure to the contents of the tank, a protective bushing constituting a sleeve-like body encircling the element and extending through the opening in the tank wall with an inner flange of substantial radial extent adjacent the inner surface of the lined tank wall and an outer crimped flange securing the bushing in place, a sealing washer confined between the inner flange of said bushing and the lined tank wall under pressure to prevent entrance of the fluid contents of the tank therebetween, and means sealing the bushing to the element when the latter is secured in place.

5. In a seal for an element extending through the wall of a lined metal tank wherein the edges of the tank wall at the opening for the element are protected from exposure to the contents of the tank, a protective bushing constituting a sleeve-like body encircling the element and extending through the opening in the tank wall with an inner flange of substantial radial extent adjacent the inner surface of the lined tank wall and an outer crimped flange securing the bushing in place, a sealing washer confined between the inner flange of said bushing and the lined tank wall under pressure to prevent entrance of the fluid contents of the tank therebetween, a sealing washer disposed on the outside of the outer flange of said bushing, and means securing a shoulder on the element against said last named sealing washer.

6. In a seal for an element extending through the wall of a lined tank wherein the edges of the tank wall at the opening for the element are protected from exposure to the contents of the tank, a protective bushing constituting a sleeve-like body encircling the element and extending through the opening in the tank wall with an inner flange of substantial radial extent adjacent the inner surface of the lined tank wall and an outer crimped flange securing the bushing in place, a sealing washer confined between the inner flange of said bushing and the lined tank wall under pressure to prevent entrance of the fluid contents of the tank therebetween, a sealing washer disposed on the outside of the outer flange of said bushing, a plurality of studs extending outwardly from the tank wall adjacent the edge of the outer flange of the bushing and threaded on the outer end, a removable plate encircling the element and pressing a flange thereof against the last named sealing washer to confine the latter between the element flange and the outer flange of the bushing, and threaded nuts on the outer end of said studs to secure said plate in place.

7. A seal for mounting an electric heating element in a metal circular opening of a hot water storage tank hafing a corrosion resistant lining, comprising a corrosion resistant plastic washer mounted about the inner side of said opening, a corrosion-resistant sleeve mounted in said opening and having an inner flange pressed tightly against said plastic washer and an outer flange pressed tightly against the outside of said tank, a second corrosion resistant plastic washer mounted against said outer flange, and means urging said element in contact against said second washer to complete the seal.

8. In a seal for sealing an electric heating element mounted in the circular aperture provided therefor within the metal tank wall of an electric hot water storage heater having a corrosion resistant lining, a corrosion-resistant bushing placed within said aperture and formed with circumferential flanges engaging the inside and outside of said tank wall, said electric element being mounted in said bushing and secured against said outer flange engaging the outside of said tank wall, a corrosion resistant plastic washer seal between said tank wall and said inner flange, and a second corrosion resistant plastic washer seal between said outer flange and said element.

9. A seal for mounting an electric heating element in a circular opening of a hot water storage tank having a corrosion resistant lining, a plastic washer mounted about the inner side of said opening, a corrosion-resistant sleeve mounted in said opening and having an inner flange pressed tightly against said plastic washer and an outer flange pressed tightly against the outside of said tank, a second plastic washer mounted against said outer flange, spaced studs welded about the opening and extending from the outside of said tank, and a plate fitted to engage said element and studs to urge the element against said second washer to complete the seal.

10. In a seal for sealing an electric heating element mounted in a circular aperture provided therefor within the tank wall of a corrosion resistant lined electric hot water storage heater, a corrosion-resistant bushing placed between said wall and said element and formed with flanges circumferentially engaging the inside and outside of said tank wall, a plastic washer sealing the area between one of said flanges and the inside of said tank wall, a plurality of studs spaced about said aperture and extending from the outside of said tank wall with the outer ends thereof threaded to receive nuts for securing the assembly in place, a corrosion resistant mounting flange on said element assembled over said studs, and a corrosion resistant second plastic washer seal pressed tightly between the outer of said bushing flanges and said mounting flange with the selective tightening of the nuts on said studs.

ADOLPH POKRAS.

REFERENCES CITED

The following references are of record in the file of this patent:

UNITED STATES PATENTS

| Number | Name | Date |
| --- | --- | --- |
| 170,019 | Rowell | Nov. 16, 1875 |
| 1,916,066 | Moyle | June 27, 1933 |
| 1,916,804 | McNab | July 4, 1933 |
| 2,256,906 | Mullen | Sept. 23, 1941 |
| 2,266,611 | Martin | Dec. 16, 1941 |
| 2,274,445 | Greer | Feb. 24, 1942 |
| 2,343,618 | Lawton | Mar. 7, 1944 |
| 2,347,686 | Hothersall | May 2, 1944 |
| 2,403,670 | Martin | July 9, 1946 |

FOREIGN PATENTS

| Number | Country | Date |
| --- | --- | --- |
| 186,445 | Great Britain | Oct. 5, 1922 |